May 2, 1939. G. E. LINDEMANN 2,156,503
RECORDING INSTRUMENT
Filed Jan. 31, 1938
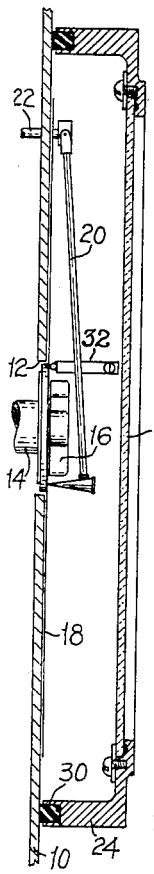
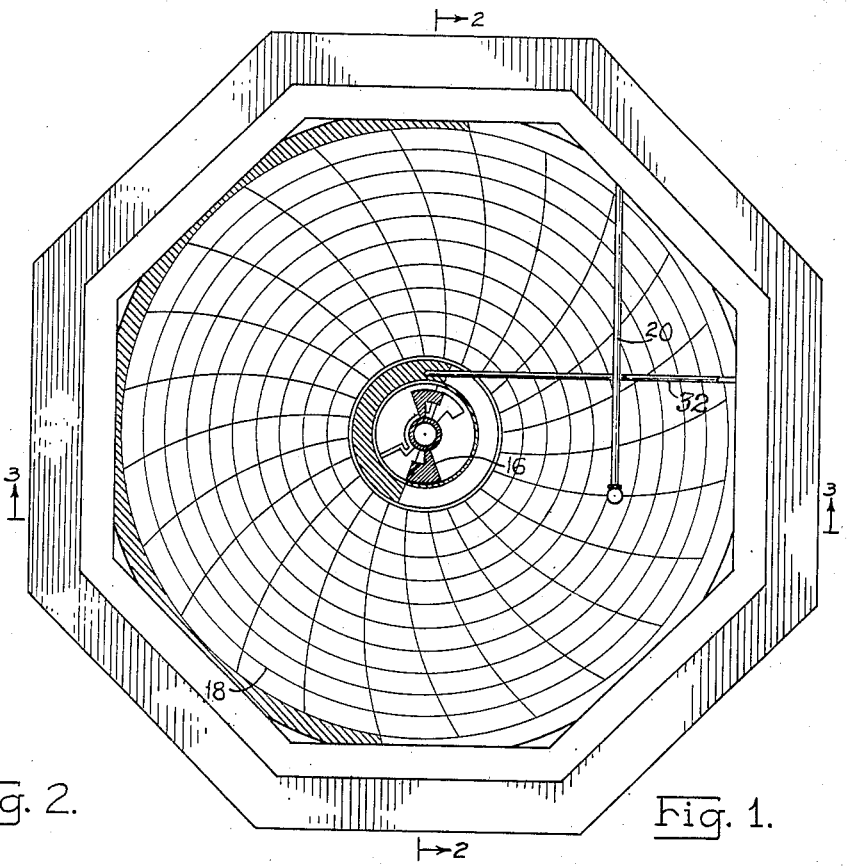
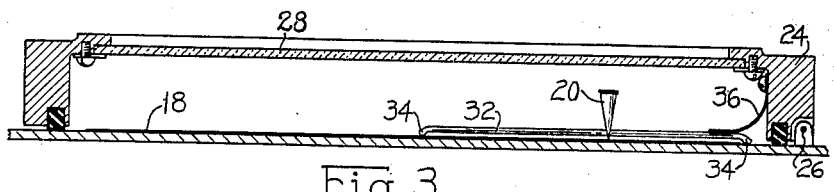
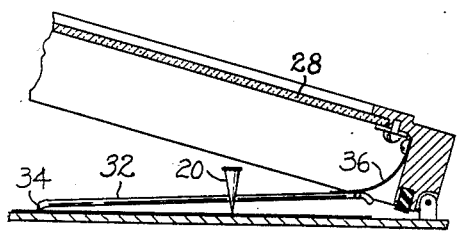
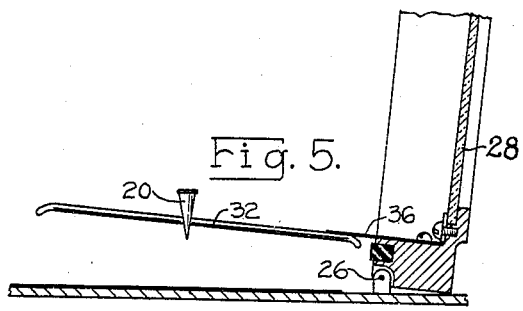
Inventor
George E. Lindemann
by McConkey Dawson + Booth
Attorneys Patented May 2, 1939

2,156,503

UNITED STATES PATENT OFFICE 2,156,503

RECORDING INSTRUMENT

George E. Lindemann, Chicago, Ill., assignor to Republic Flow Meters Company, Chicago, Ill., a corporation of Illinois Application January 31, 1938, Serial No. 187,857

6 Claims. (Cl. 234—72)

This invention relates to recording instruments and more particularly to means for lifting the pen or pens in an instrument of the type which makes a record on a moving chart.

One of the objects of the invention is to provide a recording instrument in which the pen or pens will be raised each time the cover is opened. Preferably the act of opening the cover in itself operates to raise the pen.

Another object of the invention is to provide a simple and inexpensive means to raise the pen in a recording instrument in which the pen is moved slowly adjacent the chart but is moved faster when it is away from the chart.

Other objects, advantages and novel features of the invention will be apparent from the following description when read in connection with the accompanying drawing, in which:

Figure 1 is an elevation of an instrument embodying the invention;

Figures 2 and 3 are sections on the lines 2—2 and 3—3 respectively of Figure 1; and Figures 4 and 5 are views similar to Figure 3 showing the parts in different positions.

The illustrated instrument comprises a panel 10 having a central opening 12 through which a driving post 14 extends. The post 14 may be driven by any suitable clock mechanism and carries chart clamping means illustrated as being of the type more particularly disclosed and claimed in my copending application Serial No. 187,858 filed January 31, 1938.

A chart 18 formed of a circular disc of paper or the like suitably graduated is secured over the panel 10 by the chart clamping means and has a record made thereon by a pen 20 pivotally secured to a shaft 22 which projects through the panel outside the periphery of the chart. The shaft 22 may be operated by suitable mechanism, not shown, responsive to temperature, pressure, rate of flow or other condition to be recorded.

The chart and pen are enclosed by a cover formed of a suitable frame 24 having its walls extending perpendicular to the panel 10 and hinged to the panel at one side as shown at 26. A pane of glass or the like 28 closes the cover and a gasket 30 carried thereby insures a tight seal against the panel.

In order to raise the pen from the chart when the cover is opened there is provided, according to the present invention, an elongated rod 32 lying under the pen and extending at substantially a right angle to the axis of hinges 26. The ends of the rod are preferably bent down as at 34 to engage the chart and hold the center part of the rod away from the chart. A leaf spring 36 is secured at one end to the inner side wall of frame 24 adjacent the hinges 26 and at its other end to the adjacent end of the rod 32.

When the cover is closed the spring 36 will bend as indicated in Figure 3 to hold both ends 34 of the rod against the chart. This is the normal operating position in which the pen rests on the chart and makes a record thereon as the chart is rotated.

As the cover is opened the tendency of spring 36 to straighten out holds the inner end of the rod against the chart and raises the outer end as indicated in Figure 4. During initial opening movement of the cover the inner end of the rod acts as a pivot point so that the center portion of the rod which engages the pen will have a slow movement. Thus the pen will be raised gently from the chart and there will be no danger of jarring ink from the pen or otherwise of smearing or blotting the chart.

Upon further opening the cover, the spring 36 will eventually reach a condition in which it is substantially straightened out in alinement with the rod 32 as shown in Figure 5. Thereafter the inner end of the rod will be raised from the chart, angular movements of the rod and cover being the same, and the pen will be raised rapidly to a position a substantial distance from the chart.

If it should be desired for any reason to move the pen into contact with a chart when the cover is open, the rod 32 can be pressed down manually, deflecting the spring and permitting the pen to move into contact with the chart.

As the cover is closed the operations described above will be reversed, the pen being moved rapidly toward the chart and then slowly into contact therewith after the inner end of the rod engages the chart.

While only one embodiment of the invention has been shown and described it will be apparent that many changes might be made therein and it is not intended to limit the scope of the invention to the exact form shown nor otherwise than by the terms of the appended claims.

What is claimed is:

1. In a recording instrument having a pivotally mounted pen for making a record on a chart and a hinged cover, a pen lifter comprising an elongated member secured to and carried solely by said cover and lying under the pen to raise the pen when the cover is opened.

2. In a recording instrument having a pivotally mounted pen for making a record on a chart and a hinged cover, a pen lifter comprising an elongated member lying under the pen and resilient means securing said member to the cover to raise the pen when the cover is opened.

3. In a recording instrument having a pivotally mounted pen for making a record on a chart and a hinged cover, a pen lifter comprising an elongated member lying under the pen and a leaf spring secured at one end to said member and at its other end to the cover to raise the pen when the cover is opened.

4. In a recording instrument having a pivotally mounted pen for making a record on a chart and a hinged cover, a pen lifter comprising an elongated member lying under the pen and extending substantially at right angles to the hinge axis of the cover, and a leaf spring secured at one end to the cover adjacent the hinges thereon and at its other end to said member.

5. In a recording instrument having a pivotally mounted pen and a hinged cover with a wall portion adjacent its hinges lying substantially at a right angle to the face of the instrument when the cover is closed, the combination of a pen lifter comprising an elongated member lying under the pen and extending substantially at right angles to the axis of the cover hinges, and a leaf spring secured at one end to said member and at its other end to said wall portion.

6. In a recording instrument having a pivotally mounted pen and a hinged cover with a wall portion adjacent its hinges lying substantially at a right angle to the face of the instrument when the cover is closed, the combination of a pen lifter comprising a rod lying under the pen and extending substantially at a right angle to the axis of the cover hinges, the ends of said rod being turned down to engage a chart on the instrument while holding its center portion out of contact with the chart, and a leaf spring secured at one end to said rod and at its other end to said wall portion.

GEORGE E. LINDEMANN.